United States Patent
Kim et al.

(10) Patent No.: US 9,545,717 B2
(45) Date of Patent: Jan. 17, 2017

(54) ROBOT HAND AND HUMANOID ROBOT HAVING THE SAME

(71) Applicant: SAMSUNG ELECTRONICS CO., LTD., Suwon-si, Gyeonggi-do (KR)

(72) Inventors: Ji Young Kim, Anyang-si (KR); Kwang Kyu Lee, Yongin-si (KR); Young Do Kwon, Yongin-si (KR); Kyung Shik Roh, Seongnam-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 228 days.

(21) Appl. No.: 13/734,062

(22) Filed: Jan. 4, 2013

(65) Prior Publication Data
US 2013/0173055 A1  Jul. 4, 2013

(30) Foreign Application Priority Data
Jan. 4, 2012 (KR) .................. 10-2012-0000845

(51) Int. Cl.
| | | |
|---|---|---|
| *B25J 9/00* | (2006.01) | |
| *B25J 9/16* | (2006.01) | |
| *B25J 15/00* | (2006.01) | |

(52) U.S. Cl.
CPC ........... *B25J 9/1612* (2013.01); *B25J 15/0009* (2013.01); *G05B 2219/39466* (2013.01); *G05B 2219/39497* (2013.01); *G05B 2219/39546* (2013.01); *G05B 2219/40407* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,302,138 A | * | 11/1981 | Zarudiansky | B25J 3/04 414/5 |
| 4,575,297 A | * | 3/1986 | Richter | B25J 9/0006 414/5 |
| 4,623,183 A | * | 11/1986 | Aomori | B25J 15/103 294/106 |
| 5,004,391 A | * | 4/1991 | Burdea | B25J 3/04 294/200 |

(Continued)

FOREIGN PATENT DOCUMENTS

| | | |
|---|---|---|
| CN | 1218936 A | 6/1999 |
| CN | 101804633 A | 8/2010 |

(Continued)

OTHER PUBLICATIONS

Cutkosky, Mark R., "On Grasp Choice, Grasp Models and the Design of Hands for Manufacturing Tasks", Jun. 1989, IEEE Transactions on Robotics and Automation, vol. 5, pp. 269-279.*

(Continued)

*Primary Examiner* — Jonathan L Sample
(74) *Attorney, Agent, or Firm* — Harness, Dickey & Pierce, P.L.C.

(57) ABSTRACT

Disclosed herein is a control method of a robot hand including recognizing a pre-posture of user's fingers using a master device, changing the shape of the robot hand according to the recognized pre-posture, recognizing a gripping motion of the user's fingers using the master device, and executing a gripping motion of the robot hand according to a gripping posture corresponding to the recognized pre-posture.

20 Claims, 18 Drawing Sheets

(56) References Cited

U.S. PATENT DOCUMENTS

| | | | | |
|---|---|---|---|---|
| 5,280,265 | A * | 1/1994 | Kramer | A61B 5/6806 128/925 |
| 5,437,490 | A * | 8/1995 | Mimura | B25J 9/102 294/106 |
| 5,548,667 | A * | 8/1996 | Tu | G06T 7/004 382/115 |
| 5,631,861 | A * | 5/1997 | Kramer | G06F 3/011 414/5 |
| 5,967,580 | A * | 10/1999 | Rosheim | B25J 3/04 294/106 |
| 6,016,385 | A * | 1/2000 | Yee | B25J 3/04 446/327 |
| 6,042,555 | A * | 3/2000 | Kramer | A61B 5/225 600/595 |
| 6,565,563 | B1 * | 5/2003 | Agee | A61H 1/0288 602/21 |
| 6,701,296 | B1 * | 3/2004 | Kramer | A61B 5/6806 370/545 |
| 6,924,787 | B2 * | 8/2005 | Kramer | G06F 3/03543 345/156 |
| 7,862,522 | B1 * | 1/2011 | Barclay | A61B 5/6806 414/2 |
| 8,255,079 | B2 * | 8/2012 | Linn | B25J 9/0006 482/47 |
| 8,350,806 | B2 * | 1/2013 | Nagasaka | G06F 3/016 345/156 |
| 8,467,903 | B2 * | 6/2013 | Ihrke | B25J 9/104 700/245 |
| 8,483,880 | B2 * | 7/2013 | de la Rosa Tames | B25J 9/1045 600/595 |
| 9,333,648 | B2 * | 5/2016 | Kim | B25J 9/1612 |
| 2004/0266276 | A1 * | 12/2004 | Hariki | B25J 9/1697 439/894 |
| 2007/0078564 | A1 * | 4/2007 | Hoshino | B25J 15/0009 700/245 |
| 2007/0152619 | A1 * | 7/2007 | Sugiyama | B25J 9/1612 318/568.12 |
| 2007/0282485 | A1 * | 12/2007 | Nagatsuka | B25J 9/1671 700/245 |
| 2008/0204425 | A1 * | 8/2008 | Nagasaka | G06F 3/016 345/173 |
| 2008/0240889 | A1 * | 10/2008 | Yokoyama | B25J 9/1612 414/1 |
| 2009/0285664 | A1 * | 11/2009 | Kim | B25J 9/1612 414/730 |
| 2010/0010670 | A1 * | 1/2010 | Matsukuma | B25J 9/104 700/245 |
| 2010/0103106 | A1 * | 4/2010 | Chui | G06F 3/017 345/166 |
| 2010/0138039 | A1 * | 6/2010 | Moon | B25J 9/1612 700/245 |
| 2010/0176615 | A1 * | 7/2010 | Okuda | A61F 2/583 294/106 |
| 2010/0215257 | A1 * | 8/2010 | Dariush | G06K 9/48 382/159 |
| 2010/0292837 | A1 * | 11/2010 | Takahashi | B25J 9/1612 700/245 |
| 2011/0118877 | A1 * | 5/2011 | Hwang | B25J 13/00 700/264 |
| 2011/0238213 | A1 * | 9/2011 | Nagasaka | B25J 9/1612 700/253 |
| 2011/0288681 | A1 * | 11/2011 | Hayakawa | B25J 15/0009 700/245 |
| 2012/0078419 | A1 * | 3/2012 | Kim | B25J 9/1669 700/255 |

FOREIGN PATENT DOCUMENTS

| | | |
|---|---|---|
| CN | 102012740 A | 4/2011 |
| JP | 5-57637 | 3/1993 |
| JP | 2000-132305 A | 5/2000 |
| JP | 2006-212741 | 8/2006 |
| KR | 10-1193125 | 10/2012 |
| WO | WO-2007/097548 A1 | 8/2007 |

OTHER PUBLICATIONS

Chinese Office Action issued in Chinese Patent Application No. 201310001514.4, dated Jul. 29, 2015.

Chinese Office Action and English translation thereof issued in Chinese Patent Application No. 201310001514.4, dated May 3, 2016.

Notification of Grant and English translation thereof issued in Chinese Patent Application No. 201310001514.4, dated Nov. 3, 2016.

* cited by examiner (a)  (b)

(a)   (b)

ROBOT HAND AND HUMANOID ROBOT HAVING THE SAME

CROSS-REFERENCE TO RELATED APPLICATIONS

This application claims the benefit of Korean Patent Application No. 10-2011-0000845, filed on Jan. 4, 2012 in the Korean Intellectual Property Office, the disclosure of which is incorporated herein by reference.

BACKGROUND

1. Field

Embodiments of the present invention relate to a control method of a robot hand which reproduces a motion desired by user through a master device manipulated by the user.

2. Description of the Related Art

In general, robot apparatuses mean machinery which automatically executes desired motions and operations. Recently, manipulator robots appear, and cause a user to execute various motions and operations while manipulating end effectors corresponding to robot hands. Here, the robot hand may include a thumb and remaining fingers provided in a shape similar to a human hand. The robot hand may perform motions according to a predetermined program or be autonomously controlled by a stored algorithm. However, the robot hand may be controlled by a master device manipulated by a remote user, and execute operation while reproducing a motion desired by the user.

In addition to the similar shape to the human hand, the robot hand may have various shapes, i.e., a shape including at least a pair of opposite fingers to effectively grip an object. In this case, the motion of the robot hand is dissimilar from the motion of a human hand (fingers or palm), and thus the robot hand does not reproduce various motions of the human hand only by mapping change of angles of joints of human fingers or positions of the tips of the human fingers to the robot hand.

SUMMARY

Therefore, one or more embodiments relate to a control method of a robot hand which recognizes a pre-posture of a user, changes the shape of the robot hand based on the recognized pre-posture of the user, recognizes a gripping motion of the user, and grips an object according to a desired gripping posture.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a control method of a robot hand may include recognizing a pre-posture of user's fingers using a master device, changing the shape of the robot hand according to the recognized pre-posture, recognizing a gripping motion of the user's fingers using the master device, and executing a gripping motion of the robot hand according to a gripping posture corresponding to the recognized pre-posture.

The change of the shape of the robot hand may include changing the shape of an adducted and abducted joint of the robot hand.

The change of the shape of the robot hand may further include fixing the adducted and abducted joint of the robot hand at designated rigidity after change of the shape of an adducted and abducted joint of the robot hand.

The execution of the gripping motion of the robot hand may include estimating a distance between the tip of the user's thumb and the tips of the remaining fingers as a width of an object, and estimating a mean distance from the user's palm to the tips of the fingers gripping the object as a height of the object from the palm, in the recognized gripping motion.

The execution of the gripping motion of the robot hand may further include adjusting a distance between the tips of opposite fingers of the robot hand according to the width of the object, and adjusting a distance from a base of the robot hand to the tips of the fingers of the robot hand according to the height of the object from the palm.

The execution of the gripping motion of the robot hand may include adjusting angles of joints of the fingers of the robot hand according to angles of joints of the user's fingers in the recognized gripping motion.

The execution of the gripping motion of the robot hand may further include bending the fingers at one side from among the opposite fingers of the robot hand according to the angles of the user's remaining fingers, and bending the fingers at the other side from among the opposite fingers of the robot hand according to the angle of the user's thumb.

In accordance with one or more embodiments, a control method of a robot hand may include recognizing a pre-posture of user's fingers using a master device, judging a gripping posture desired by the user from the recognized pre-posture, changing the shape of the robot hand according to the recognized pre-posture, recognizing a gripping motion of the user's fingers using the master device, and executing a gripping motion of the robot hand according to the gripping posture desired by the user.

The change of the shape of the robot hand may include changing the shape of an adducted and abducted joint of the robot hand.

In the judgment of the gripping posture desired by the user, the gripping posture desired by the user may be judged as one of pinch grip and power grip.

In the judgment of the gripping posture desired by the user, the gripping posture desired by the user may be judged as power grip, when proximal interphalangeal joints of the user's fingers in the recognized pre-posture are bent to a reference angle or more.

The execution of the gripping motion of the robot hand may include executing the gripping motion of the robot hand by executing interpolation between the pre-posture of the robot hand and the power grip of the robot hand.

In the judgment of the gripping posture desired by the user, the gripping posture desired by the user may be judged as pinch grip, when proximal interphalangeal joints of the user's fingers in the recognized pre-posture are unfolded at below a reference angle.

The execution of the gripping motion of the robot hand may include executing the gripping motion of the robot hand by executing interpolation between the pre-posture of the robot hand and the pinch grip of the robot hand.

In accordance with one or more embodiments, a control method of a robot hand may include recognizing a pre-posture of user's fingers using a master device, storing a pre-posture of the robot hand corresponding to the recognized pre-posture, recognizing a gripping posture of the user's finger using the master device, storing a gripping posture of the robot hand corresponding to the recognized gripping posture, and executing interpolation between the pre-posture of the robot hand and the gripping posture of the robot hand.

In the execution of the interpolation between the pre-posture of the robot hand and the gripping posture of the robot hand, the angles of joints of fingers of the robot hands may be interpolated.

In the execution of the interpolation between the pre-posture of the robot hand and the gripping posture of the robot hand, the positions of the tips of fingers of the robot hands may be interpolated.

In accordance with one or more embodiments, a control method of a robot hand may include recognizing a pre-posture of user's fingers using a master device, changing the shape of the robot hand according to the recognized pre-posture, and maintaining the shape of the robot hand, when changes of the angles of joints of the user's fingers in the recognized pre-posture are smaller than a reference change.

The maintenance of the shape of the robot hand may include adjusting the shape of an adducted and abducted joint of the robot hand, when a change of the angle of the adducted and abducted joint of the user's fingers is smaller than the reference change.

BRIEF DESCRIPTION OF THE DRAWINGS

These and/or other aspects of the invention will become apparent and more readily appreciated from the following description of the embodiments, taken in conjunction with the accompanying drawings of which:

FIGS. 5(a) to 9(b) are views schematically illustrating user gripping methods in accordance with one or more embodiments;

FIGS. 10(a) to 13(b) are views schematically illustrating changed shapes of the robot hand in accordance with one or more embodiments;

DETAILED DESCRIPTION

Figure 1:
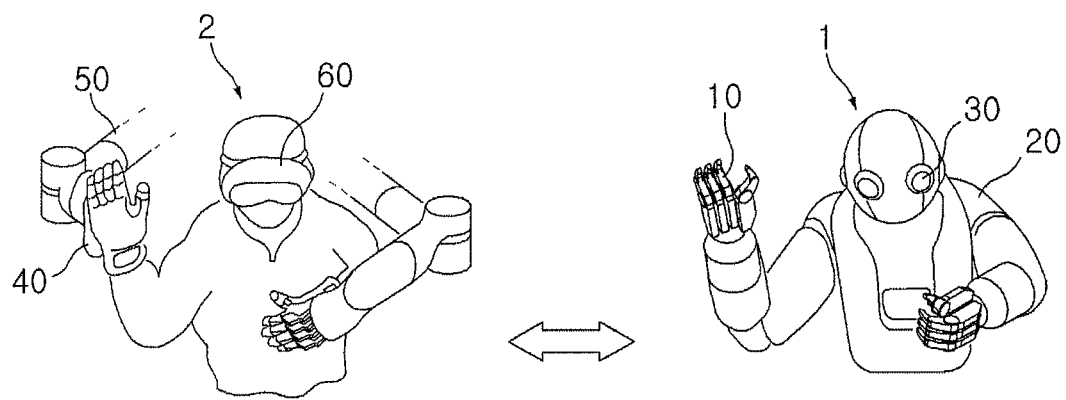
FIG. 1 is a view schematically illustrating a control method of a robot apparatus in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view schematically illustrating a control method of a robot apparatus in accordance with one or more embodiments.

With reference to FIG. 1, a robot apparatus 1 may be controlled by a master device 2. In such case, when a user moves the master device 2 by manipulating the master device 2, the master device 2 may recognize the motion of the user. Then, motion information of the user recognized by the master device 2 may be transmitted to the robot apparatus 1, and the robot apparatus 1 may execute a motion desired by the user.

For this purpose, the master device 2 may include master hands 40, master arms 50, and a master head unit 60. The robot apparatus 1 may include robot hands 10, robot arms 20, and a robot head unit 30, corresponding to the master device 2.

A neck joint may be provided under the robot head unit 30, and image sensors may be provided on the front surface of the robot head unit 30. The robot apparatus 1 may acquire an image in front of the robot head unit 30 through the image sensors. The master head unit 60 may include a head mounted display, and may be mounted on the user's head. The robot head unit 30 may drive the neck joint according to the motion of the user's head recognized by the master head unit 60, and thus may execute a motion desired by the user. The image acquired through the image sensors may be transmitted to the master head unit 60, and may be displayed to the user through the head mounted display.

The robot hands 10 and the robot arms 20 may drive respective joints according to the motions of the user's hands (fingers and palms) and arms recognized by the master hands 40 and the master arms 50, and thus may execute a motion desired by the user. For example, the robot hands 10 may reproduce the motion of the user's fingers and thus grip an object.

Figure 2:
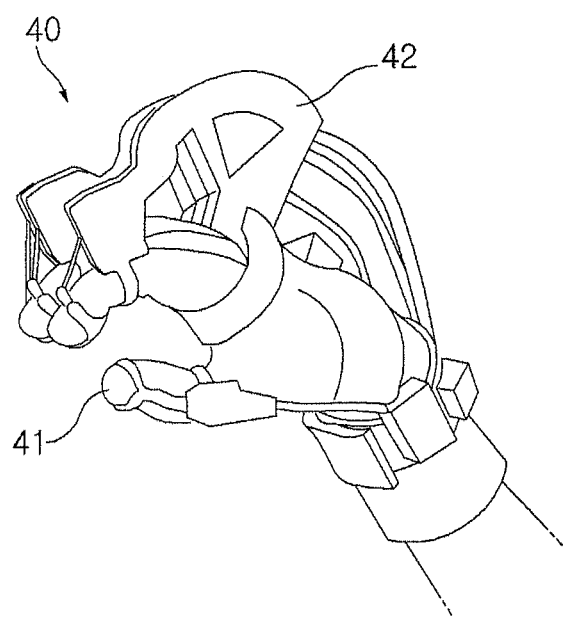
FIG. 2 is a view schematically illustrating the structure of a master hand in accordance with one or more embodiments.

FIG. 2 is a view schematically illustrating the structure of the master hand in accordance with one or more embodiments.

With reference to FIG. 2, the master hand 40 may include a glove-type device 41 to measure angles of joints of user's fingers. An actuator structure 42 may be formed on the exoskeleton of the glove-type device 41, and force feedback to the user may be carried out through an actuator. Further, the master hand 40 may include an exoskeleton-shaped structure including a plurality of links. In this case, the plural links may transmit force feedback to the user simultaneously with measurement of the angles of the joints of the user's fingers.

The master hand 40 is not limited to the above-described configuration, but may be formed in a shape which may recognize a motion of the user's fingers and transmit force feedback to the user hand through the actuator.

Figure 3:
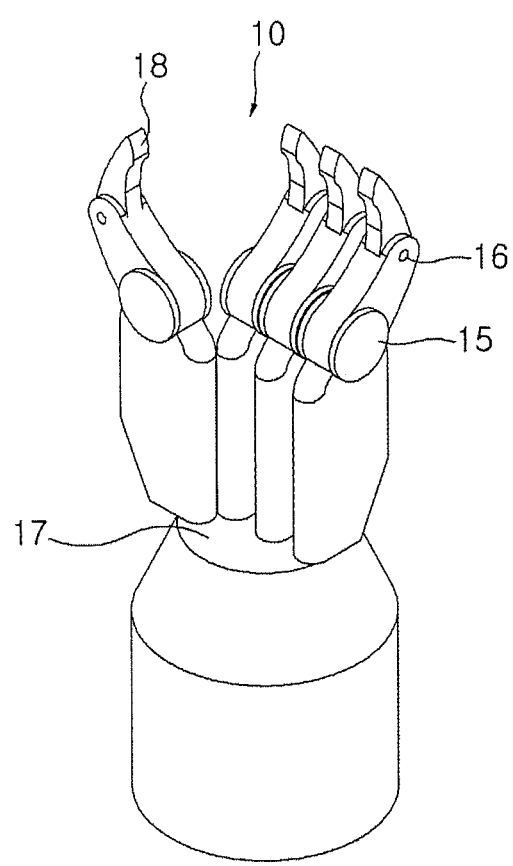
FIG. 3 is a view schematically illustrating the structure of a robot hand in accordance with one or more embodiments.

FIG. 3 is a view schematically illustrating the structure of the robot hand in accordance with one or more embodiments.

With reference to FIG. 3, the robot hand 10 may include a rotary joint 17, first interphalangeal joints 15, and second interphalangeal joints 16.

The rotary joint 17 may be rotatable using the lengthwise direction of the robot hand 10 as an axis. The rotary joint 17 may correspond to a joint of a human finger executing adduction or abduction. Here, abduction refers to a motion of spreading fingers out based on the longitudinal-sectional plane of a human hand, and adduction refers to motion of gathering the fingers on the contrary to the abduction. The structure of the robot hand 10 may not be similar to the structure of the human hand, but may execute abduction in which the fingers move distant from each other and adduction in which the fingers move close to each other, according to rotation of the rotary joint 17.

The first interphalangeal joints 15 and the second interphalangeal joints 16 may correspond to distal interphalangeal joints, metacarpophalangeal joints and proximal interphalangeal joints of human fingers. Therefore, the robot hand 17 may execute a motion of bending the fingers and a motion of extending the fingers through the first interphalangeal joints 15 and the second interphalangeal joints 16.

Thereby, the robot hand 10 may execute pinch grip of picking an object up with end surfaces 18 of opposite fingers, and power grip of surrounding an object with the inner surfaces of the fingers and the surface of the palm.

The robot hand 10 is not limited to the above-described configuration, but may be configured in a multi-degree of freedom type similar to a human hand, or be configured in various types of joints executing adduction and abduction so as to be operated in a dissimilar posture from the posture of the human hand.

Figure 4:
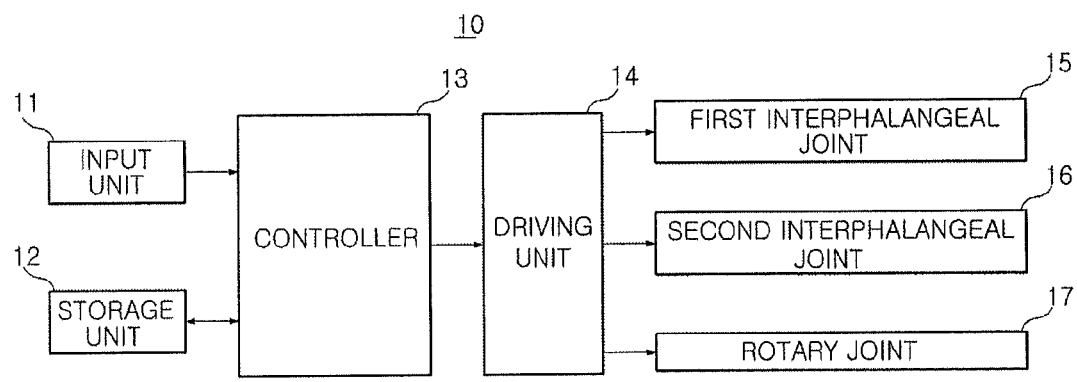
FIG. 4 is a block diagram schematically illustrating the configuration of the robot hand in accordance with one or more embodiments.
Figure 5:
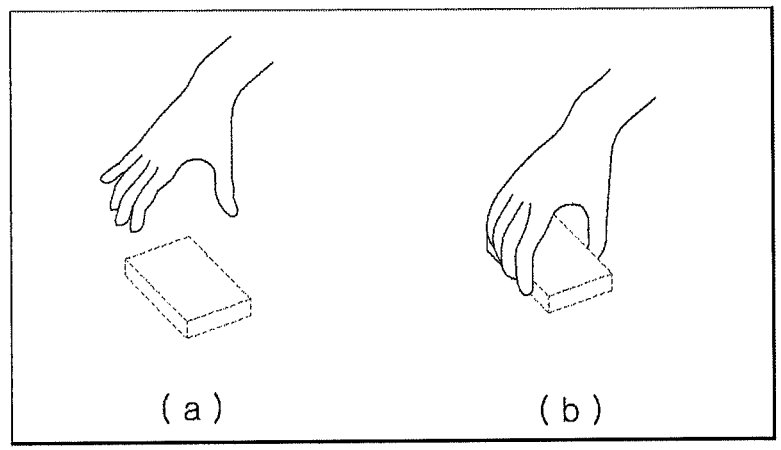
Figure 6:
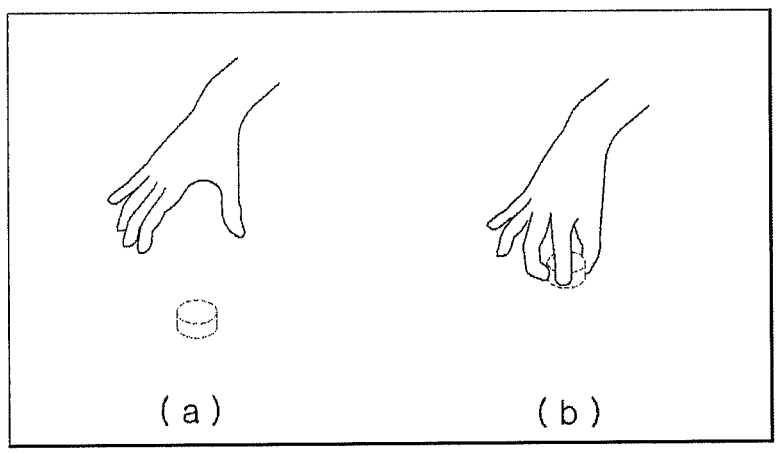
Figure 7:
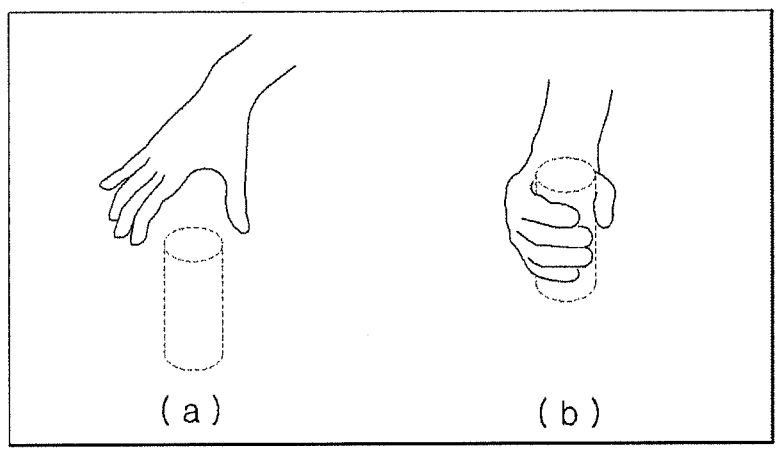
Figure 8:
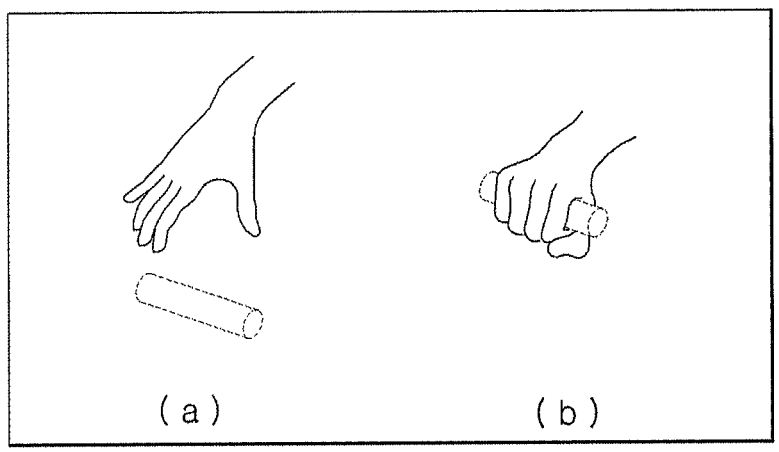
Figure 9:
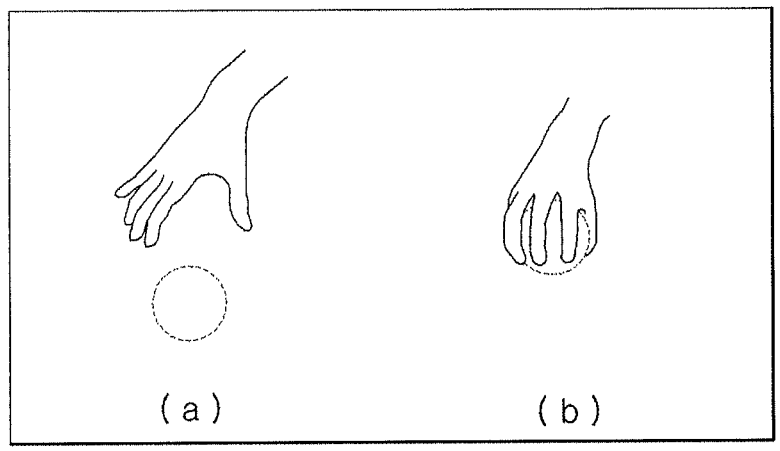
Figure 10:
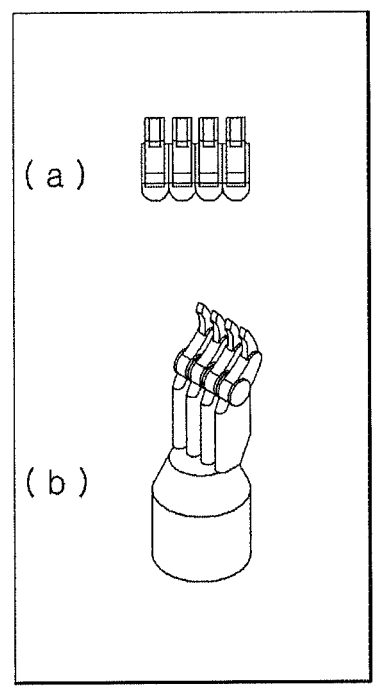
Figure 11:
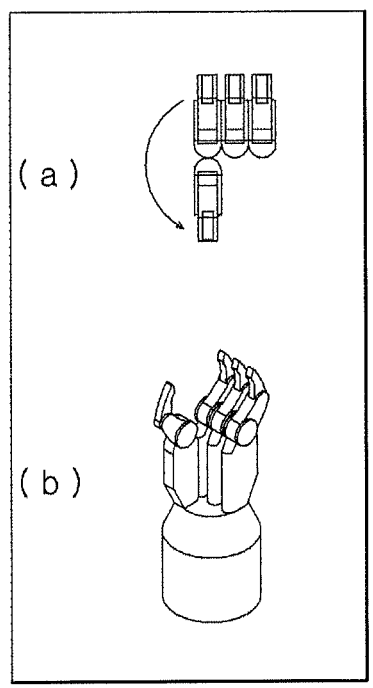
Figure 12:
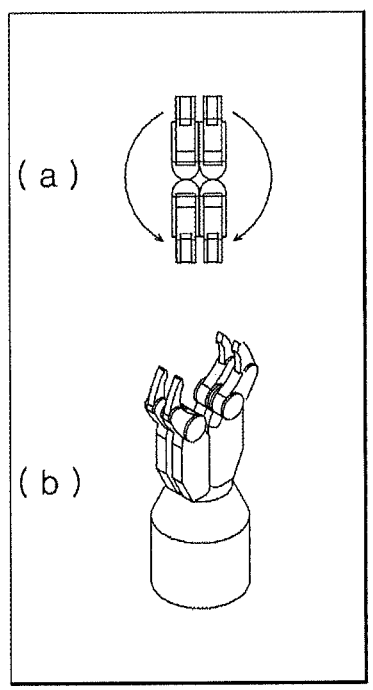
Figure 13:
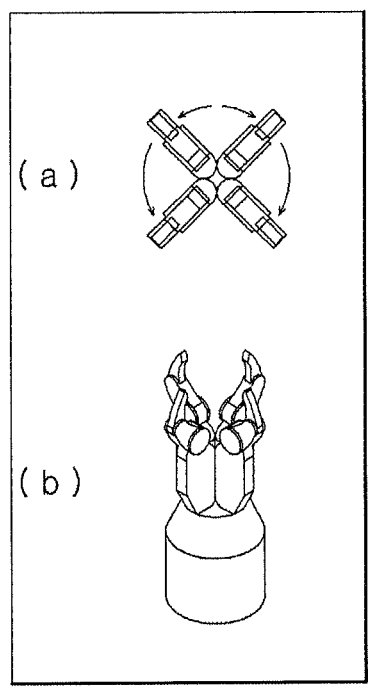

FIG. 4 is a block diagram schematically illustrating the configuration of the robot hand in accordance with one or more embodiments.

With reference to FIG. 4, the robot hand 10 may include an input unit 11 to which user motion information is input, a storage unit 12 in which a fixed posture of the robot hand 10 is stored, a controller 13 controlling the overall operation of the robot hand 10, and driving units 14 driving the respective joints of the robot hand 10.

The input unit 11 may be connected to the master hand 40 by wire or wirelessly, and may receive the user motion information from the master hand 40. Further, the input unit 11 may transmit the received user motion information to the controller 13.

The storage unit 12 may be provided with a data storage space, and may store a pre-posture, a griping posture, etc. of the robot hand 10.

The controller 13 may judge a posture of a user according to the user motion information received through the input unit 11. The controller 13 may change the shape of the robot hand 10 according to the pre-posture of the user recognized using the master hand 40. Further, the controller 13 may change the shape of the robot hand 10 again or may maintain the shape of the robot hand 10 by judging whether or not changes of the angles of the joints of the user's fingers in the pre-posture of the user exceed a reference change. Further, the controller 13 may judge a gripping posture desired by the user by judging whether or not the angles of the joints of the user's fingers in the pre-posture of the user exceed a reference angle. Further, the controller 13 may cause the robot hand 10 to grip an object while interpolating a gripping path of the robot hand 10 according to a gripping motion of the user recognized using the master hand 40.

FIGS. 5(a) to 9(b) are views schematically illustrating user gripping methods in accordance with one or more embodiments.

With reference to FIGS. 5(a) to 9(b), user gripping methods are generally divided into pinch grip of picking an object up with end surfaces of fingers and power grip of surrounding an object with the inner surfaces of fingers and the surface of a palm.

With reference to FIGS. 5(a) and 5(b), general pinch grip is a method of gripping both parallel surfaces of an object by bending a user's thumb and the remaining fingers so that they are opposite.

With reference to FIGS. 6(a) and 6(b), annular pinch grip is a method of gripping three or more surfaces of an object by spreading user's respective fingers out so that the tips of the thumb and the remaining fingers are located on a virtual circumference or spherical surface.

Further, with reference to FIGS. 7(a) and 7(b), cylindrical power grip is a method of surrounding a cylindrical object by bending fingers so that the inner surface of the thumb and the inner surfaces of the remaining fingers are opposite and gathering the remaining fingers.

Further, with reference to FIGS. 8(a) and 8(b), bar-type power grip is a method of surrounding a cylindrical object having a small diameter or a bar-type object by executing abduction of a user's thumb at a small angle and causing the user's thumb to surround the remaining fingers, in a similar manner to cylindrical power grip.

Further, with reference to FIGS. 9(a) and 9(b), spherical power grip is a method of surrounding a spherical object by spreading respective fingers out so that the inner surfaces of the thumb and the remaining fingers are located on a virtual circumference or spherical surface, in a similar manner to angular pinch grip.

In each of the user gripping methods, a posture before gripping an object, which is defined as a pre-posture, and a posture after gripping the object, which is defined as a gripping posture, are sequentially present, as shown in FIGS. 5(a) to 9(b). Therefore, the robot hand 10 may take a pre-posture before gripping an object and a gripping posture after gripping the object. The robot hand 10 may grip the object similar to the gripping posture of the user, or may grip the object dissimilar from the gripping posture of the user.

FIGS. 10(a) to 13(b) are views schematically illustrating changed shapes of the robot hand 10 in accordance with one or more embodiments.

With reference to FIGS. 10(a) to 13(b), the shape of the robot hand 10 may be variously changed according to motions of the rotary joint 17, the first interphalangeal joints 15 and the second interphalangeal joints 16.

With reference to FIGS. 10(a) and 10(b), in case of a first shape of the robot hand 10, all fingers are gathered. The first shape of the robot hand 10 corresponds to a pre-posture of the user in which the user's thumb is adducted to be close to the index finger and all fingers are disposed in parallel.

Further, with reference to FIGS. 11(a) and 11(b), in case of a second shape of the robot hand 10, one finger is located at the opposite side to the remaining fingers. The second shape of the robot hand 10 corresponds to a pre-posture of the user in which the user's thumb is abducted so that the tip of the user's thumb is opposite the tip of the index finger and the remaining fingers are bent to be folded.

Further, with reference to FIGS. 12(a) and 12(b), in case of a third shape of the robot hand 10, two fingers are located at the opposite side to the remaining fingers so that plural pairs of fingers are opposite each other. The third shape of the robot hand 10 corresponds to a pre-posture of the user in which the user's thumb is abducted so that the tip of the user's thumb is opposite the tips of the index finger and the middle finger, and the remaining fingers are adducted to be gathered.

Further, with reference to FIGS. 13(a) and 13(b), in case of a fourth shape of the robot hand 10, respective fingers are rotated to be distant from each other at the same angle, and the tips of the respective fingers are located on a virtual circumference. The fourth shape of the robot hand 10 corresponds to a pre-posture of the user in which the user's thumb is abducted so that the tip of the user's thumb is opposite the tips of the index finger and the middle finger and the remaining fingers are abducted to be spread out.

The robot hand 10 may grip an object while picking the object up with the tip surfaces of the fingers by executing adduction so that the tips of the fingers are parallel, or may grip an object while surrounding the object with the inner surfaces of the fingers and the surface of the palm by bending the fingers, corresponding to the user gripping method according to each changed shape.

Figure 14:
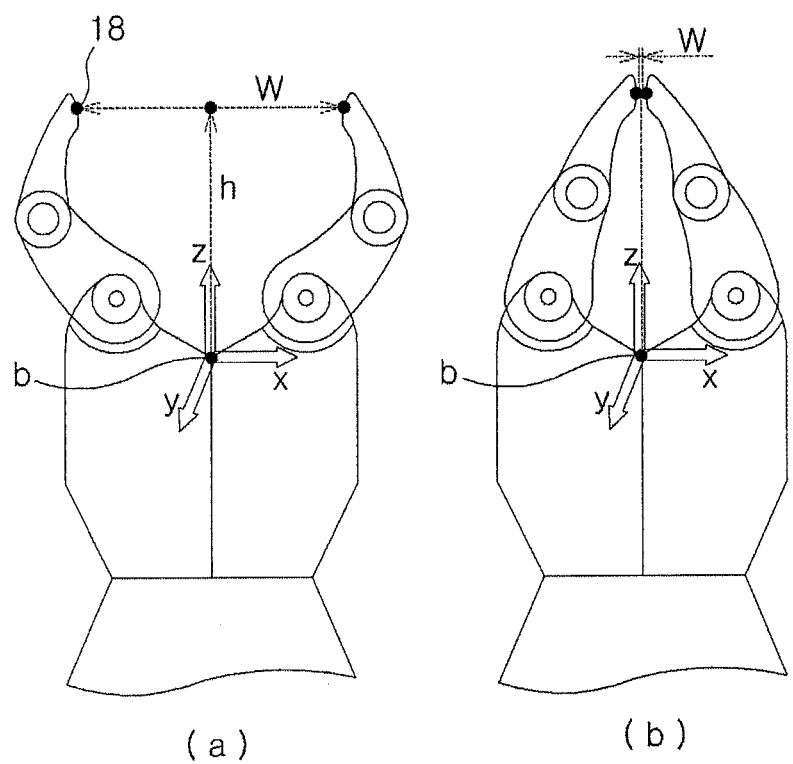
FIGS. 14(a) and 14(b) are views schematically illustrating a gripping motion of pinch grip of the robot hand in accordance with one or more or more embodiments.

FIGS. 14(a) and 14(b) are views schematically illustrating a gripping motion of pinch grip of the robot hand 10 in accordance with one or more embodiments.

With reference to FIGS. 14(a) and 14(b), in case of pinch grip, although a user does not directly grip an object, the size of the object may be estimated from the positions of the tips of the user's fingers. First, a distance between the tip of the user's thumb and the tips of the remaining fingers may be estimated as the width of the object, and the mean distance from the user's palm to the tips of the gripping fingers may be estimated as the height of the object, during the user's finger gripping motion recognized using the master hand 40. Then, a distance w between opposite fingers of the robot hand 10 may be adjusted according to the width of the object, and a distance h from a base b of the robot hand 10 to the tips of the fingers of the robot hand 10 may be adjusted according to the height of the object from the user's palm.

If acquisition of the maximum contact surface of the object with the robot hand 10 is more important than gripping of the object with the robot hand 10 through reproduction of the height of the object from the user's palm, the tip surfaces 18 of the opposite fingers of the robot hand 10 may be adjusted so as to be parallel.

Figure 15:
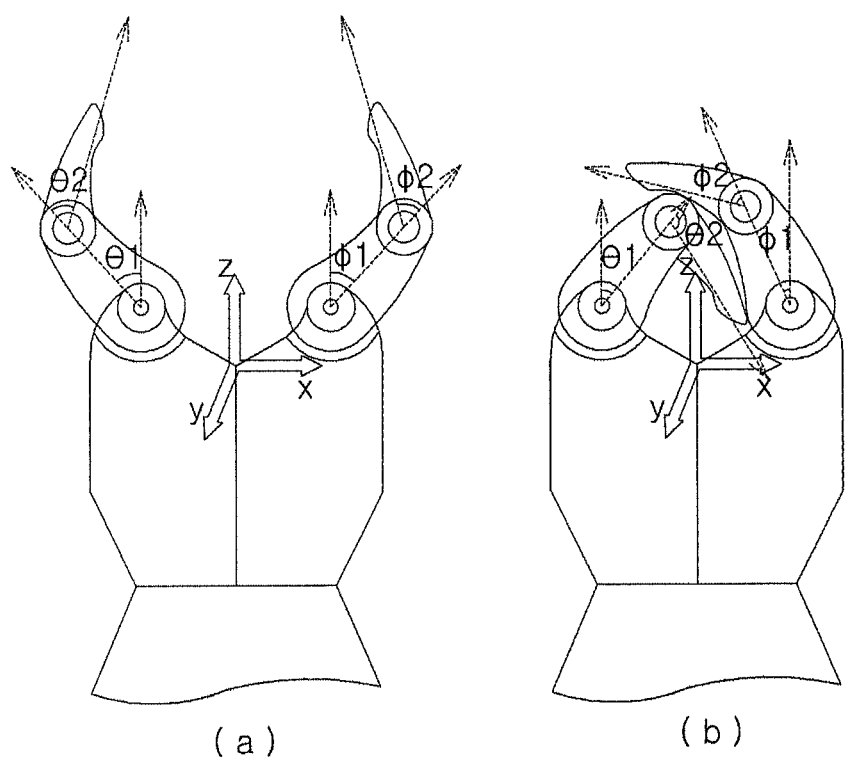
FIGS. 15(a) and 15(b) are views schematically illustrating a gripping motion of power grip of the robot hand in accordance with one or more embodiments.

FIGS. 15(a) and 15(b) are views schematically illustrating a gripping motion of power grip of the robot hand in accordance with one or more embodiments.

With reference to FIGS. 15(a) and 15(b), since power grip is a user gripping method of surrounding an object with the inner surfaces of the user's fingers and the palm, reproduction of the positions of the tips or the tip surfaces of the user's fingers is not effective. Analysis of human power grip show that angles of joints of fingers are increased according to the width of an object to be surrounded, and then the fingers are bent. Here, the object is surrounded with the surfaces of the fingers, and thus it is assumed that the position of the object is relatively fixed in the relations with the robot hand 10. Therefore, angles θ1, θ2, φ1, and φ2 of joints of the fingers of the robot hand 10 may be adjusted according to the angles of the joints of the user's fingers recognized using the master hand 40.

When power grip is executed under the condition that some fingers of the robot hand 10 are opposite each other, plural fingers may overlap. In this case, the robot hand 10 may be controlled so as to prevent collision of the fingers, as follows. First, the angles θ1 and θ2 of the joints of the fingers at one side from among the opposite fingers of the robot hand 10 may be adjusted so as to bend the fingers at this side inwardly according to the angles of the user's remaining fingers, and then, the angles φ1 and φ2 of the joints of the fingers at the other side from among the opposite fingers of the robot hand 10 may be adjusted so as to bend the fingers at this side inwardly while surrounding the fingers at the former side according to the angle of the user's thumb. Further, a situation in which the fingers of the robot hand 10 collide may be predicted to warn the user of collision of the fingers, and thus, the user may adjust the robot hand 10 to prevent collision of the fingers of the robot hand 10.

Figure 16:
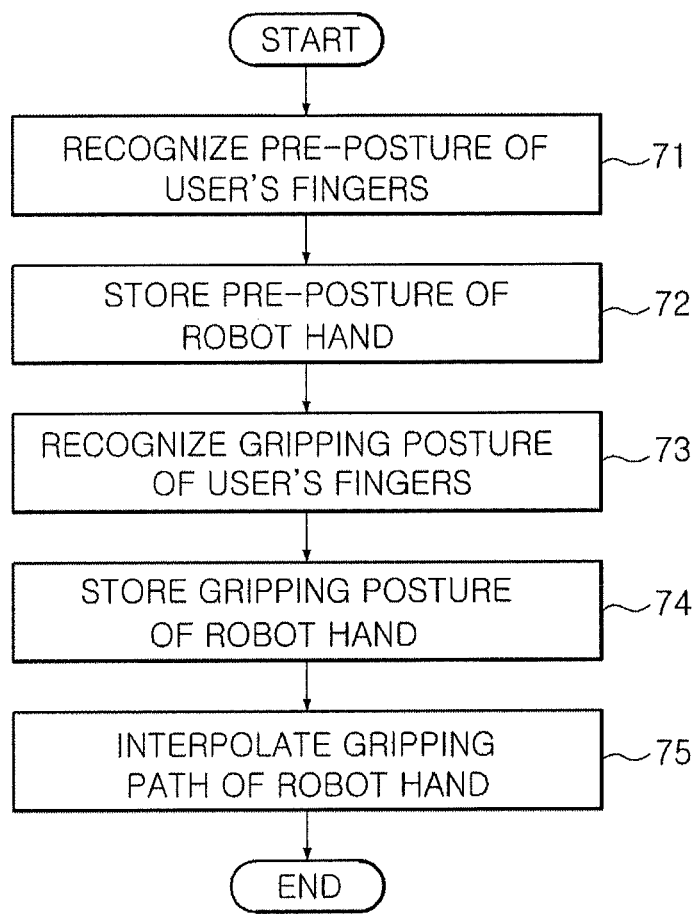
FIG. 16 is a flowchart schematically illustrating a control method of a robot hand in accordance with one or more embodiments.

FIG. 16 is a flowchart schematically illustrating a control method of a robot hand in accordance with one or more embodiments.

With reference to FIG. 16, a pre-posture of user's fingers may be recognized using the master hand 40 (Operation 71). Four pre-postures of the user's fingers may be present. That is, the four pre-postures of the user's fingers may include, for example, a pre-posture for general pinch grip, a pre-posture for bar-type power grip, a pre-posture in which general pinch grip and cylindrical power grip are executable, and a pre-posture in which annular pinch grip and spherical power grip are executable.

Thereafter, a pre-posture of the robot hand 10 corresponding to the recognized pre-posture of the user's fingers may be stored in the storage unit 12 (Operation 72). Here, the pre-posture of the robot hand 10 may correspond to one of the first to fourth shapes of the robot hand 10, and may mean a basic posture in which in each of the respective changed shapes of the robot hand 10, the first interphalangeal joints 15 and the second interphalangeal joints 16 do not execute a bending motion and an extending motion.

In the same manner as the pre-posture, a gripping posture of the user's fingers may be recognized using the master hand 40 (Operation 73). Five gripping postures of the user's fingers may be present. That is, the five gripping postures of the user's fingers may include, for example, a gripping posture for general pinch grip, a gripping posture for annular pinch grip, a gripping posture for cylindrical power grip, a gripping posture for bar-type power grip, and a gripping posture for spherical power grip.

Thereafter, a gripping posture of the robot hand 10 corresponding to the recognized gripping posture of the user's fingers may be stored in the storage unit 12 (Operation 74). Here, the gripping posture of the robot hand 10 may be provided corresponding to the gripping posture of the user's fingers. The gripping posture of the robot hand 10 may be changed from the pre-posture of the robot hand 10, bar-type power grip may be applied to the first shape of the robot hand 10, general pinch grip may be applied to the second and third shapes of the robot hand 10, cylindrical power grip may be applied to the third shape of the robot hand 10, and annular pinch grip and spherical power grip may be applied to the fourth shape of the robot hand 10.

Thereby, a pair of the pre-posture of the user's fingers and the pre-posture of the robot hand 10 and a pair of the gripping posture of the user's fingers and the gripping posture of the robot hand 10 may be stored.

Thereafter, a gripping path of the robot hand 10 may be interpolated and then stored in the storage unit 12 (Operation 75). A gripping motion from the pre-posture of the user to the gripping posture of the user may include a plurality of sections. The pre-posture of the robot hand 10 and the gripping posture of the robot hand 10 may be stored together with the angles of the joints of the fingers of the robot hand 10 and the positions of the tips of the fingers of the robot hand 10. Therefore, if a posture of the robot hand 10 between the pre-posture of the robot hand 10 and the gripping posture of the robot hand 10 is interpolated, the gripping path including the angles of the joints of the fingers of the robot hand 10 and the positions of the tips of the fingers of the robot hand 10 in the gripping motion of the robot hand 10 may be stored. Thereby, if the robot hand 10 is controlled using the master hand 40, the robot hand 10 may execute the gripping motion according to the gripping path stored in advance.

Even if the gripping path of the robot hand 10 is not stored in the storage unit 12, when the pre-posture and the gripping posture of the robot hand 10 are stored in the storage unit 12, the robot hand 10 may execute the gripping motion according to the gripping path while executing interpolation between the pre-posture and the gripping posture of the robot hand 10 in real time.

Figure 17:
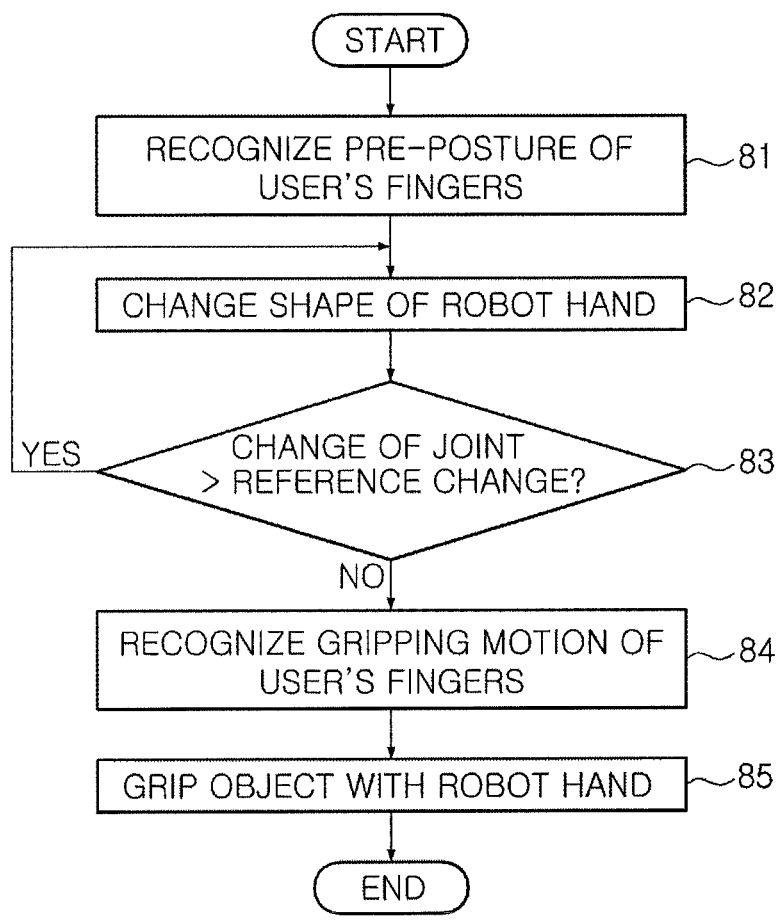
FIG. 17 is a flowchart schematically illustrating a control method of a robot hand in accordance with one or more embodiments.

FIG. 17 is a flowchart schematically illustrating a control method of a robot hand in accordance with one or more embodiments.

With reference to FIG. 17, a pre-posture of user's fingers may be recognized using the master hand 40 (Operation 81). Here, one of four pre-postures of the user's fingers corresponding to the changed shapes of the robot hand 10 may be recognized. If the user spreads all fingers out and adducts the thumb so that the thumb is close to the index finger, the pre-posture of the user's fingers may be judged as a pre-posture for bar-type power grip. Further, if the user abducts the thumb so that the tip of the thumb is opposite the tip of the index finger and bends the remaining fingers to fold the remaining fingers inward, the pre-posture of the user's fingers may be judged as a pre-posture for general pinch grip. Further, if the user abducts the thumb so that the tip of the thumb is opposite the tips of the index finger and the middle finger and gathers the remaining fingers, the pre-posture of the user's fingers may be judged as a pre-posture for general pinch grip or cylindrical power grip. Further, if the user abducts the thumb so that the tip of the thumb is opposite the tips of the index finger and the middle finger and spreads the remaining fingers out, the pre-posture of the user's fingers may be judged as a pre-posture for annular pinch grip or spherical power grip.

Thereafter, the shape of the robot hand 10 may be changed according to the recognized pre-posture of the user's fingers (Operation 82). A pre-posture of the robot hand 10 corresponding to the pre-posture of the user's fingers may be judged from the pre-postures of the robot hand 10 stored in the storage unit 12, and the shape of the robot hand 10 may be changed so as to correspond to the judged pre-posture of the robot hand 10. Thereby, in case of the pre-posture for bar-type power grip, the shape of the robot hand 10 may be changed to the first shape, in case of the pre-posture for general pinch grip, the shape of the robot hand 10 may be changed to the second shape, in case of the pre-posture for general pinch grip or cylindrical power grip, the shape of the robot hand 10 may be changed to the third shape, and in case of the pre-posture for annular pinch grip or spherical power grip, the shape of the robot hand 10 may be changed to the fourth shape.

Thereafter, whether or not changes of the angles of the joints of the user's fingers in the recognized pre-posture of the user's fingers exceed a reference change may be judged (Operation 83). If the changes of the angles of the joints of the user's fingers do not exceed the reference change, the shape of the robot hand 10 may be maintained. In more detail, if the change of the angle of the joint of the user's fingers which is adducted and abducted does not exceed the reference change, the shape of the rotary joint 17 of the robot hand 10 which is adducted and abducted may be maintained. Here, designated force may be applied to the rotary joint 17 of the robot hand 10 adducted and abducted so as to allow the rotary joint 17 to have designated rigidity, and thus the rotary joint 17 of the robot hand 10 may be fixed so as not to be adducted and abducted. On the other hand, if the changes of the angles of the joints of the user's fingers exceed the reference change, the shape of the robot hand 10 may be changed again so as to correspond to the pre-posture of the user's fingers.

Thereafter, a gripping motion of the user's fingers may be recognized using the master hand 40 (Operation 84). The gripping motion of the user's fingers may include a plurality of sections according to the gripping path of the user's fingers. Further, interpolation between the pre-posture and the gripping posture of the robot hand 10 may be executed and then the gripping path of the robot hand 10 may be stored in the storage unit 12 in advance, or the gripping path 10 may be generated while executing interpolation between the pre-posture and the gripping posture of the robot hand 10 in real time according to the gripping path of the user's fingers. Therefore, a gripping motion of the user's fingers may be recognized, and the posture of the robot hand 10 corresponding to a section of the gripping motion on the gripping path of the robot hand 10 may be judged.

Thereafter, a gripping motion of the robot hand 10 may be executed according to the gripping posture corresponding to the pre-posture of the user's fingers (Operation 85). Here, the gripping posture may be bar-type power grip or general pinch grip. The posture of the robot hand 10 may be adjusted according to the gripping path from the pre-posture of the robot hand 10 to the gripping posture of the robot hand 10. Here, the posture of the robot hand 10 may be adjusted in real time according to the posture of the user's fingers.

Figure 18:
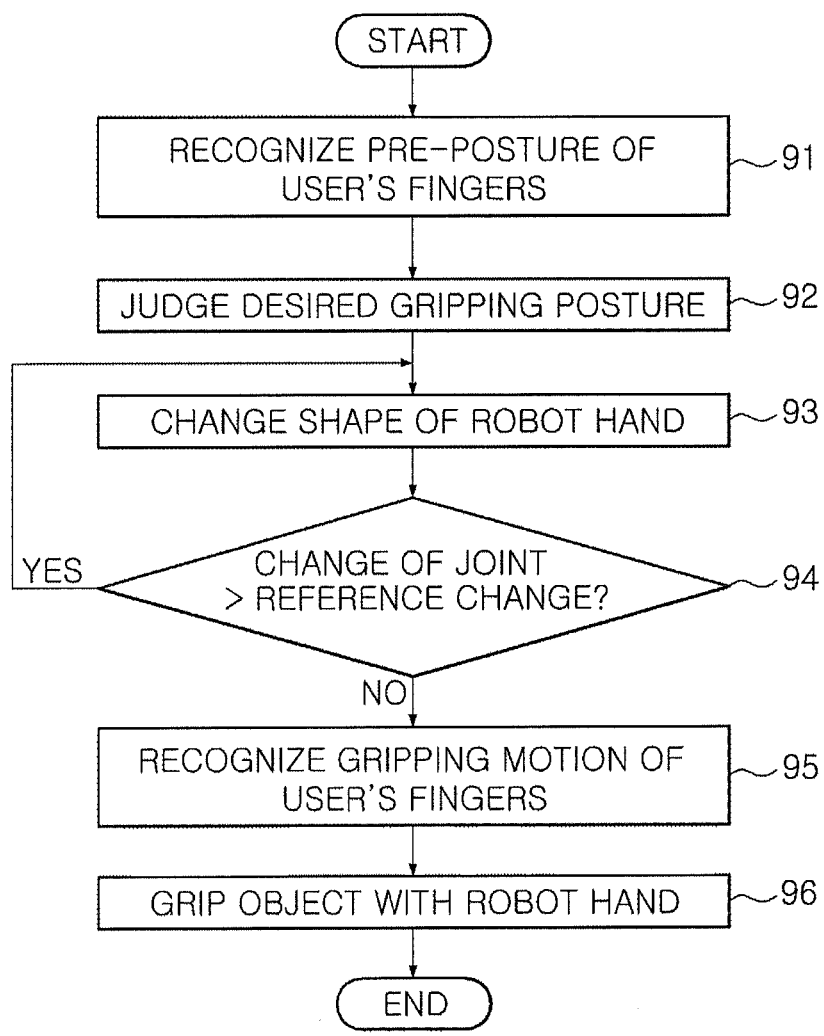
FIG. 18 is a flowchart schematically illustrating a control method of a robot hand in accordance with one or more embodiments.

FIG. 18 is a flowchart schematically illustrating a control method of a robot hand in accordance with one or more embodiments.

With reference to FIG. 18, a pre-posture of user's fingers may be recognized using the master hand 40 (Operation 91).

Thereafter, a gripping posture desired by the user may be judged from the recognized pre-posture of the user's fingers (Operation 92). If pinch grip or power grip is executable in the pre-posture of the user's fingers, the gripping posture desired by the user may be judged as one of pinch grip and power grip. If the proximal interphalangeal joints of the user's fingers in the pre-posture of the user's fingers are bent at a designated angle or more, the gripping posture desired by the user may be judged as power grip. Further, when if proximal interphalangeal joints of the user's fingers in the pre-posture of the user's fingers are unfolded at below the designated angle, the gripping posture desired by the user may be judged as pinch grip.

Thereafter, the shape of the robot hand 10 may be changed according to the recognized pre-posture of the user's fingers (Operation 93). Thereafter, whether or not changes of the angles of the joints of the user's fingers in the recognized pre-posture of the user's fingers exceed a reference change may be judged (Operation 94). If the changes of the angles of the joints of the user's fingers do not exceed the reference change, the shape of the robot hand 10 may be maintained. On the other hand, if the changes of the angles of the joints of the user's fingers exceed the reference change, the shape of the robot hand 10 may be changed again so as to correspond to the pre-posture of the user's fingers.

Thereafter, a gripping motion of the user's fingers may be recognized using the master hand 40 (Operation 95). Thereafter, a gripping motion of the robot hand 10 may be executed according to the gripping posture desired by the user (Operation 96). The posture of the robot hand 10 may be adjusted according to the gripping path from the pre-posture of the robot hand 10 to the gripping posture of the robot hand 10. Here, the posture of the robot hand 10 may be adjusted in real time according to the posture of the user's fingers. If the gripping posture desired by the user is judged as power grip, a gripping path may be generated by executing interpolation between the pre-posture of the robot hand 10 and power grip of the robot hand 10, and the gripping motion of the robot hand 10 may be executed according to the generated gripping path. Further, if the gripping posture desired by the user is judged as pinch grip, a gripping path may be generated by executing interpolation between the pre-posture of the robot hand 10 and pinch grip of the robot hand 10, and the gripping motion of the robot hand 10 may be executed according to the generated gripping path.

As is apparent from the above description, in a control method of a robot hand in accordance with one or more embodiments, the shape of the robot hand may be changed according to a recognized pre-posture of user's fingers, and thus, even if the shape of the robot hand is dissimilar from the shape of a human hand, the robot hand may easily grip an object using a master device. Further, since the shape of the robot hand may be changed according to a kind of object, the robot hand may effectively grip the object while securing the maximum contact area of the robot hand with the object. Further, the robot hand may execute a gripping motion while interpolating a gripping path of the robot hand according to a desired gripping posture acquired by recognizing a gripping motion of the user, and may thus smoothly grip the object without one-to-one mapping between the angles of joints of the user's fingers and the positions of the tips of the user's fingers and the robot hand.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A control method of a robot hand comprising:
   recognizing, by one or more processors, one of a plurality of pre-postures of a user's fingers using a master device;
   judging a pre-posture of the robot hand corresponding to the recognized pre-posture of the user's fingers, and changing the shape of the robot hand to correspond to the judged pre-posture of the robot hand, the robot hand including finger structures and a rotary joint, the changing including rotating the finger structures via the rotary joint about a longitudinal axis corresponding to a lengthwise direction of the robot hand;
   recognizing a gripping motion of the user's fingers using the master device; and
   executing a gripping motion of the robot hand according to a gripping posture corresponding to the recognized pre-posture of the user's fingers.

2. The control method according to claim 1, wherein the change of the shape of the robot hand comprises changing the shape of an adducted and abducted joint of the robot hand.

3. The control method according to claim 2, wherein the change of the shape of the robot hand further comprises fixing the adducted and abducted joint of the robot hand at designated rigidity after the change of the shape of the adducted and abducted joint of the robot hand.

4. The control method according to claim 1, wherein the execution of the gripping motion of the robot hand comprises estimating a distance between the tip of the user's thumb and the tips of the remaining fingers as a width of an object, and estimating a mean distance from the user's palm to the tips of the fingers gripping the object as a height of the object from the palm, in the recognized gripping motion of the user's fingers.

5. The control method according to claim 4, wherein the execution of the gripping motion of the robot hand further comprises adjusting a distance between the tips of opposing finger structures of the robot hand according to the width of the object, and adjusting a distance from a base of the finger structures of the robot hand to the tips of the finger structures of the robot hand according to the height of the object from the palm.

6. The control method according to claim 1, wherein the execution of the gripping motion of the robot hand comprises adjusting angles of joints of the finger structures of the robot hand according to angles of joints of the user's fingers in the recognized gripping motion of the user's fingers.

7. The control method according to claim 6, wherein the execution of the gripping motion of the robot hand further comprises bending the finger structures at one side from among the opposing finger structures of the robot hand according to the angles of joints of the user's remaining fingers, and bending the finger structures at the other side from among the opposing finger structures of the robot hand according to the angle of joints of the user's thumb.

8. A control method of a robot hand comprising:
recognizing, by one or more processors, one of a plurality of pre-postures of a user's fingers using a master device;
judging a pre posture of the robot hand corresponding to the recognized pre-posture of the user's fingers and a gripping posture desired by the user from the recognized pre-posture of the user's fingers;
changing the shape of the robot hand to correspond to the judged pre-posture of the robot hand, the robot hand including finger structures and a rotary joint, the changing including rotating the finger structures via the rotary joint about a longitudinal axis corresponding to a lengthwise direction of the robot hand;
recognizing a gripping motion of the user's fingers using the master device; and
executing a gripping motion of the robot hand according to the judged gripping posture desired by the user.

9. The control method according to claim 8, wherein the change of the shape of the robot hand comprises changing the shape of an adducted and abducted joint of the robot hand.

10. The control method according to claim 8, wherein, in the judgment of the gripping posture desired by the user, the gripping posture desired by the user is judged as one of a pinch grip and a power grip.

11. The control method according to claim 10, wherein, in the judgment of the gripping posture desired by the user, the gripping posture desired by the user is judged as the power grip when proximal interphalangeal joints of the user's fingers in the recognized pre-posture are bent at a reference angle or more.

12. The control method according to claim 11, wherein the execution of the gripping motion of the robot hand comprises executing the gripping motion of the robot hand by interpolating between the pre-posture of the robot hand and the power grip of the robot hand.

13. The control method according to claim 10, wherein, in the judgment of the gripping posture desired by the user, the gripping posture desired by the user is judged as a pinch grip when proximal interphalangeal joints of the user's fingers in the recognized gripping motion are unfolded at below a reference angle.

14. The control method according to claim 13, wherein the execution of the gripping motion of the robot hand comprises executing the gripping motion of the robot hand by interpolating between the pre-posture of the robot hand and the pinch grip of the robot hand.

15. A control method of a robot hand comprising:
recognizing, by one or more processors, one of a plurality of pre-postures of a user's fingers using a master device;
judging a pre-posture of the robot hand corresponding to the recognized pre-posture of the user's fingers and changing the shape of the robot hand to correspond to the judged pre-posture of the robot hand, the robot hand including finger structures and a rotary joint, the changing including rotating the finger structures via the rotary joint about a longitudinal axis corresponding to a lengthwise direction of the robot hand; and
maintaining the shape of the robot hand when an amount of changing of angles of joints of the user's fingers in the recognized pre-posture of the user's fingers are smaller than a reference amount of changing.

16. The control method according to claim 15, wherein the maintenance of the shape of the robot hand includes maintaining the shape of an adducted and abducted joint of the robot hand when an amount of changing of the angle of the adducted and abducted joint of the user's fingers is smaller than the reference amount of changing.

17. A control apparatus of a robot hand comprising:
an input unit configured to receive user motion information;
a storage unit configured to store a fixed posture of the robot hand;
a controller configured to control the overall operation of the robot hand; and
a plurality of driving units configured to drive respective joints of the robot hand,
wherein the controller is configured to recognize one of a plurality of pre-postures of a user's fingers based on the user motion information, judges a pre-posture of the robot hand corresponding to the recognized pre-posture of the user's fingers and controls each of the driving units to drive respective joints of the robot hand to change the shape of the robot hand to correspond to the judged pre-posture of the robot hand, recognizes a gripping motion of the user's fingers based on the user motion information and to execute a gripping motion of the robot hand according to a gripping posture corresponding to the recognized pre-posture of the user's fingers, the robot hand including finger structures and a rotary joint, the finger structures configured to be rotatable via the rotary joint about a longitudinal axis corresponding to a lengthwise direction of the robot hand.

18. The control apparatus of a robot hand according to claim 17, wherein the controller is configured to determine a gripping path of the robot hand by interpolating between the recognized pre-posture of the robot hand and a gripping posture of the robot hand.

19. The control apparatus of a robot hand according to claim 17, wherein the controller is configured to maintain the shape of the robot hand when changes of angles of joints of the user's fingers in the recognized pre-posture are smaller than a reference change.

20. The control method of claim 1, wherein each of the finger structures is configured to be individually rotatable about the longitudinal axis corresponding to the lengthwise direction of the robot hand.

\* \* \* \* \*